Oct. 25, 1960 E. W. HOLMAN ET AL 2,957,950

TRANSISTOR SELECTIVE RINGING CIRCUIT

Filed Nov. 18, 1954 2 Sheets-Sheet 1

INVENTORS: E. W. HOLMAN
W. C. SCHMIDT

BY [signature]

ATTORNEY

Oct. 25, 1960 E. W. HOLMAN ET AL 2,957,950

TRANSISTOR SELECTIVE RINGING CIRCUIT

Filed Nov. 18, 1954 2 Sheets-Sheet 2

INVENTORS: E. W. HOLMAN
W. C. SCHMIDT

BY [signature]
ATTORNEY

United States Patent Office 2,957,950

Patented Oct. 25, 1960

2,957,950

TRANSISTOR SELECTIVE RINGING CIRCUIT

Erwin W. Holman, Summit, and William C. Schmidt, Carlstadt, N.J., assignors to Bell Telephone Laboratories, Incorporated, New York, N.Y., a corporation of New York Filed Nov. 18, 1954, Ser. No. 469,645

7 Claims. (Cl. 179—84)

This invention relates to selective signaling circuits and more particularly to selective ringing circuits for telephone party lines.

Telephone systems are known in the prior art which provide for selective ringing of a plurality of separate parties on a common line. Two of the most common types of such systems are those employing polarized relays or gas tubes in which the variable providing the selectivity are choice of line conductor and choice of voltage polarity. Such systems, however, are limited to a relatively small number of subscribers, and semiselective or code ringing generally is required when it is desired to add additional parties to the line, as may become necessary in rural areas.

It has been proposed to provide full selective ringing of larger numbers of parties on a common line by means of a differently tuned ringer set at each subscriber station and a plurality of corresponding ringing frequencies at the central office. One arrangement of this type is disclosed by A. H. Inglis and L. E. Krebs Patent 2,604,545 issued July 22, 1952, in which tuned reed relays are utilized as the selective means. Such circuits are hampered by their narrow frequency band of sensitivity which requires extreme precision in the central office oscillators.

It is a general object of this invention to provide improved multiparty full selective ringing circuits.

It is another object of this invention to provide selective ringing circuits which are not critical to slight variations in the frequency of the ringing signal. Thus it is an object of this invention to allow more reasonable oscillator stabilities in the frequency generating and transmitting equipment at the central office.

It is a further object of this invention to provide such tuned ringing circuits employing elements of compact size, capable of being mounted in a telephone subset, of economical construction, and low current and power consumption.

It is a still further object of this invention to assure against false ringing on transmission to a subset of signals of frequencies other than that to which the subset is to be responsive.

In one specific illustrative embodiment of this invention, the selective ringing circuit comprises a pair of electrical networks tuned to the signaling frequency, to which are applied a number of single-frequency ringing signals over the common line. The networks, which are series connected across the subscriber loop and have their outputs in circuit with a transistor amplifier, comprise a signal network and a guard network, respectively antiresonant and resonant at the signaling frequency. At this frequency, essentially the full input signal appears across the antiresonant circuit where it is rectified and fed to the amplifier circuit to cause the transistor to conduct sufficiently to energize a relay which controls the application of operating voltage to the ringer. At frequencies remote from the signaling frequency, essentially the full input signal appears across the resonant circuit where it is rectified to produce a negative voltage which tends to reduce the transistor current and prevent operation of the ringer.

In another specific illustrative embodiment of the invention, the circuits are similar to the ones described above with the exception that the transistor is caused to conduct upon application of the signaling frequency to operate an A.C. ringer directly. In this embodiment, currents of the signaling frequency cause the transistor circuit to become self-oscillating at a frequency which will operate an A.C. ringer.

In accordance with one feature of this invention, an antiresonant signal network and a resonant guard network are tuned to the signaling frequency and combine to control a transistor operated ringer.

In accordance with a further feature of this invention the resonant and antiresonant networks are each connected to a transistor amplifier through rectifier elements so that a voltage appearing across one of the networks causes current of only one polarity to be applied to the transistor amplifier and a voltage appearing across the other of the networks causes current of only the other polarity to be applied to the transistor amplifier. More specifically, it is a feature of this invention that a diode is connected between the antiresonant signal network and the emitter circuit of the transistor amplifier ringing circuit so that upon appearance of a signal frequency voltage across the antiresonant network the emitter current through the transistor is increased to operate the ringing circuit. And it is a feature of this invention that a diode is connected between the resonant guard network and the transistor amplifier ringing circuit so that upon appearance of signal frequency voltages across the resonant network the emitter current through the transistor is decreased to prevent operation of the ringing circuit.

It is a still further feature of this invention that the transistor amplifier ringing circuit be inhibited by the application of negative current to the emitter circuit of the transistor to assure against false operation of the ringing circuit on other than the particular signal frequency of the particular station or subset.

It is still another feature of this invention that the resonant and antiresonant signal networks be connected in series across the subscriber line, the base of the transistor amplifier being connected to the common junction of the two networks and each network being connected to the emitter circuit of the transistor amplifier.

In accordance with a further feature of one embodiment of this invention, the currents of the signaling frequency cause a transistor circuit to become self-oscillating at a frequency which will operate an A.C. ringer directly.

A complete understanding of this invention and of the various features thereof may be gained from consideration of the following detailed description and the accompanying drawing, in which.

Figure 1:
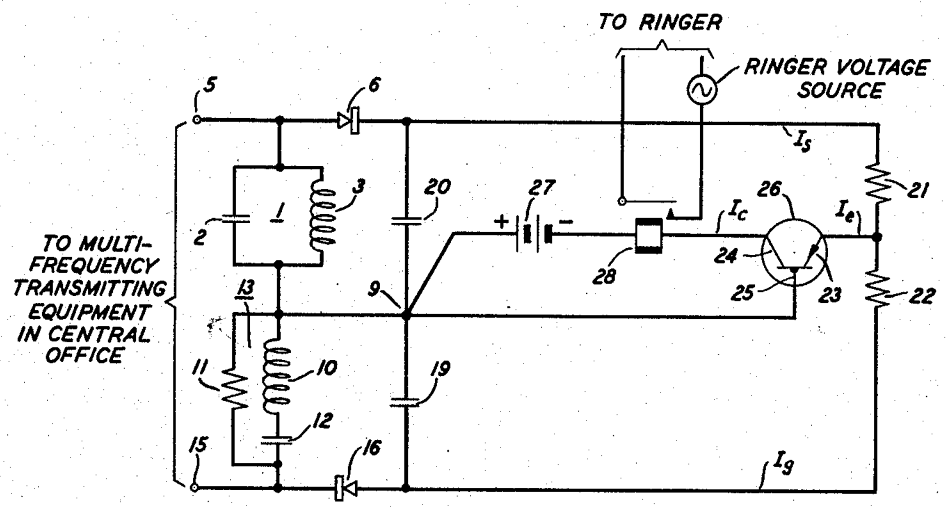
Fig. 1 is a schematic representation of a transistor selective ringing circuit illustrative of one specific embodiment of the invention.

To simplify the disclosure of the invention the talking portions of the preferred embodiments illustrated in the drawing have been omitted and only the signaling portions of the circuit at a subscriber's station are disclosed. Although the invention is not limited to telephone use but may be employed simply for remote station signaling, it will be obvious to those familiar with the telephone art that speech transmitting and receiving apparatus may be added to the signaling circuits illustrated in the drawing, in a manner which is well known in the art, and that any one of many well-known types of telephone station sets may be employed.

Referring now to the drawing, the specific embodiment illustrated in Fig. 1 comprises an antiresonant signal network 1 having a capacitance 2 and an inductance 3 connected in parallel. One side of the network 1 is connected to a signal terminal 5 of the subscriber line and to a diode or other rectifying element 6. The other side of the network 1 is connected to a resonant guard network 13 comprising a series connected inductance 10 and capacitance 12 in parallel with a resistance 11. The resonant guard network 13 is also connected to the signal terminal 15 of the other subscriber line and to a diode or other rectifying element 16 oppositely poled to the element 6.

The common junction of the two networks 1 and 13 is connected to the junction point 9. Capacitance 20 is connected between the diode 6 and the point 9, and capacitance 19 is connected between the diode 16 and the point 9.

The diode 6 is further connected through a resistance 21 to the emitter electrode 23 of a transistor 26. Similarly, the diode 16 is connected through a resistance 22 to the emitter electrode 23. The base electrode 25 of the transistor 26 is connected to the junction point 9, to which is also connected the positive terminal of a battery 27. The negative terminal of the battery 27 is connected through the winding of a relay 28 to the collector electrode 24 of the transistor 26.

Advantageously, in accordance with an aspect of this invention, the diode 6 is poled so as to pass current when a positive voltage is developed across the antiresonant signal network 1, and diode 16 is poled so as to pass current when a negative voltage is developed across the resonant guard network 13.

In the operation of this specific embodiment of the invention, a signal applied over the subscriber loop to the input terminals 5 and 15 of the selective ringing circuit is fed into the pair of electrical networks 1 and 13. If the signal is of the frequency to which these networks are tuned, i.e., the frequency assigned to this subscriber, essentially the full input signal voltage appears across the antiresonant circuit 1. This is due to the fact that the impedance of the antiresonant circuit 1 will be high and the impedance of the resonant circuit 13 will be low at the signaling frequency. This signal voltage is rectified by the diode 6 and fed with positive polarity to the emitter electrode 23 of the transistor 26. The transistor is normally biased by the battery 27 to the extent that the quiescent value of the collector current is insufficient to operate the relay 28 which controls the application of ringing voltage to the ringer, not shown in the drawing.

The rectified positive voltage fed to the emitter electrode of the transistor causes the collector current to increase from this quiescent value sufficiently to operate relay 28 and thereby to energize the ringer.

However, at frequencies remote from the signaling frequency, i.e., when other subscribers on the party line are being called, the impedance of the antiresonant circuit 1 will be low and that of the resonant circuit 13 high. Under these conditions essentially the full input voltage appears across the series resonant guard circuit 13. The signal voltage is rectified by the diode 16, and due to the polarity of this diode, negative voltage is fed to the emitter electrode 23 of the transistor 26. This places a greater bias on the transistor and prevents an increase in the collector current over its quiescent value, thus preventing operation of the ringer relay 28.

Figure 2:
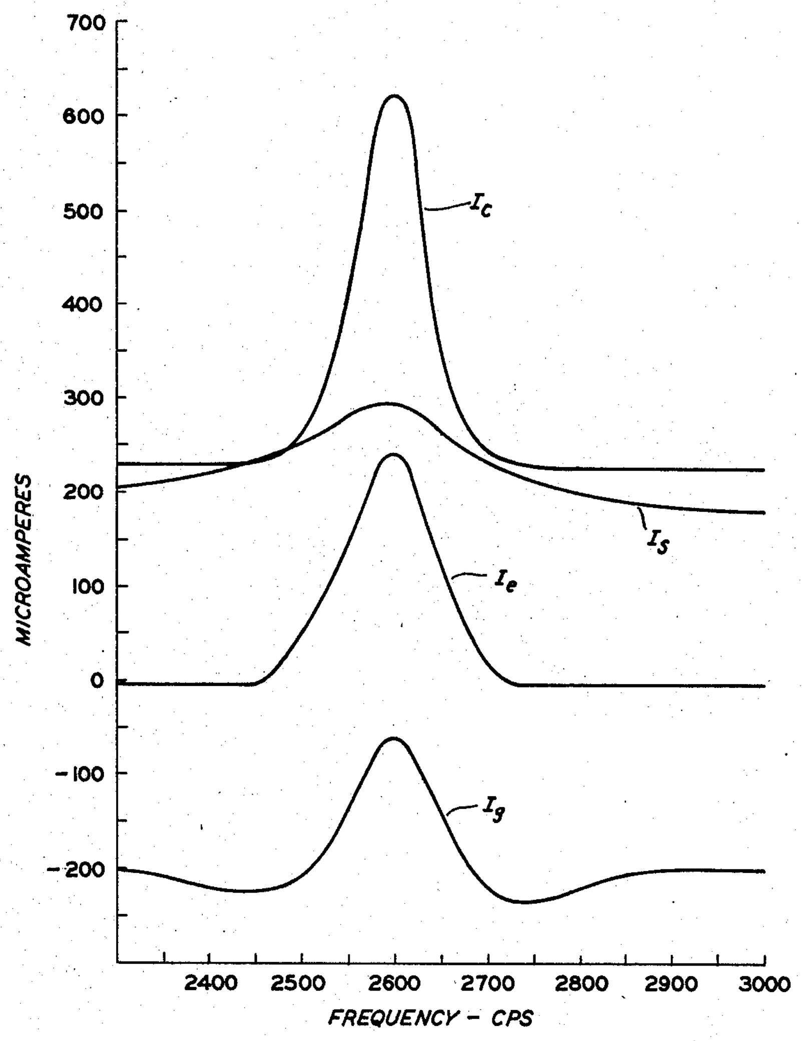
Fig. 2 is a diagram showing typical values of current distribution versus frequency for a ringing circuit in accordance with the embodiment depicted in Fig. 1.

Figure 2 is a chart showing a number of curves illustrating typical variations in guard, signal, emitter and collector currents versus frequency for a selective ringing circuit of the type shown in Fig. 1. These currents are identified as $I_g$, $I_s$, $I_e$, and $I_c$, respectively, and are so designated in Fig. 1 next to the wires in which they flow. The curves of Fig. 2 serve to illustrate the selectivity that may be obtained by circuits of this type, and specifically for one illustrative embodiment wherein the subset is to be responsive to ringing signals of 2600 cycles. A selective ringing circuit, in accordance with this invention, tuned to 2600 cycles per second conducts sufficient collector current to operate the ringer relay only at a signal frequency of 2600 cycles or frequencies immediately adjacent thereto. It is manifest from Fig. 2 that signals of 100 cycles or more remote from the tuned frequency would not result in false operation of the ringer.

Figure 3:
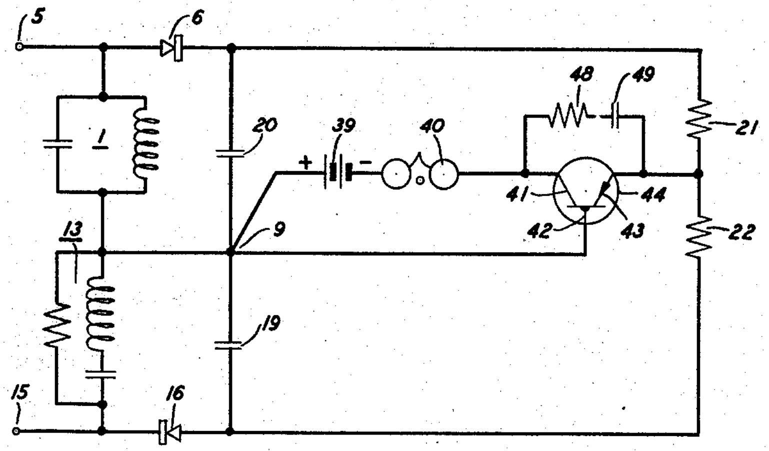
Fig. 3 is a schematic representation of a transistor selective ringing circuit illustrative of another specific embodiment of the invention.

Referring now to Fig. 3, there is shown another specific illustrative embodiment of this invention wherein currents of the signaling frequency cause the transistor circuit to become self-oscillating at a frequency which will operate an A.C. ringer, thus eliminating the necessity of supplying the circuit with separate A.C. ringing voltage. This embodiment is similar to the embodiment of Fig. 1 in several aspects and the same reference numerals are employed to identify elements common to both embodiments. Thus a signal applied to the input terminals 5 and 15 is fed into an antiresonant signal network 1 and a resonant guard network 13, each tuned to the signaling frequency. Networks 1 and 13 are connected in series across the line and are comprised of circuit elements as described above with reference to Fig. 1. Connected in parallel with the antiresonant network 1 are diode 6 poled so as to pass rectified voltage of positive polarity only, and capacitance 20. Connected in parallel with the resonant network 13 are diode 16, poled so as to pass rectified voltage of negative polarity only, and a capacitance 19.

Connected between the diodes 6 and 16 and the junction 9 of the capacitances 20 and 19 is a transistor controlled ringing circuit adapted to operate as a relaxation type oscillator. The junction 9 is connected to the positive terminal of battery 39, the negative terminal of which is connected through the windings of an A.C. ringer 40 to the collector electrode 41 of a transistor 44. Junction 9 is also connected directly to the base electrode 42 of the transistor 44. Diode 6 and diode 16 are connected through resistances 21 and 22 respectively to the emitter element 43. Connected between the emitter element 43 and the junction of the ringer 40 and collector element 41 is a resistance 48 connected in series with a capacitance 49. The repetition rate of the relaxation oscillator is determined by the time constant of this resistance-capacitance circuit.

Normally, the condenser 49 is charged through the parallel paths of the resistance 22, the capacitance 19 and the resistance 21 and the capacitance 20 through the battery 39, the ringer winding 40 and the resistance 48. The transistor base-emitter circuit is in parallel with the resistance 22 and the capacitance 19, but comprises a high impedance path in its quiescent state. When the signal applied to the input terminals 5 and 15 is at the tuned frequency, rectified voltage of a positive polarity is applied to the emitter 43 of the transistor in the manner described above in connection with Fig. 1. This voltage causes the collector current to increase from its quiescent value and changes the transistor from a high impedance to a low impedance state. Capacitance 49 is then permitted to discharge rapidly through a low impedance path comprising the transistor, the battery 39, the ringer winding 40 and the resistance 48. The surge of current through the ringer winding energizes the coil and causes the ringer to operate. The capacitance 49 continues to charge and discharge at a rate determined by the time constants of the circuit. Advantageously, the time constants may be selected to provide an oscillation rate approximating the optimum frequence of the ringer.

For signals remote from the signaling frequency to which the networks are tuned, the circuit operates in a manner similar to the circuit of Fig. 1 as described above, in that negative voltage from the resonant guard circuit tends to reduce the transistor collector current and prevent operation of the ringer.

It is to be understood that the above-described circuits are merely illustrative of the application of the principles of the invention. Numerous other arrangements may be devised by those skilled in the art without departing from the spirit and scope of the invention.

What is claimed is:

1. A ringing system for providing selective operation in response to signals of a predetermined frequency comprising a first and second line conductor, an antiresonant circuit having one terminal thereof connected to said first line conductor, a resonant circuit having one terminal thereof connected to said second line conductor, a transistor having base, emitter and collector electrodes, a terminal of said antiresonant and said resonant circuit being connected in common to said base electrode, a first diode poled so as to pass voltage of positive polarity connected to said first line conductor, a second diode poled so as to pass voltage of negative polarity connected to said second line conductor, resistance means connecting each of said diodes to said emitter electrode, capacitance means connecting each of said diodes to said base electrode, and a potential source in series with a signaling relay connected between said base electrode and said collector electrode.

2. In a selective ringing system, a ringing circuit comprising a pair of line conductors over which ringing signals of a plurality of frequencies are transmitted, tuned circuit means connected to said line conductors for generating positive voltages in response to the detection of signals of said predetermined frequency and for generating negative voltages in response to the detection of signals remote from said predetermined frequency, transistor means connected to said circuit means, the conducting condition of said transistor means being determined by said positive and negative voltages, and a ringing circuit relay in circuit with said transistor means and energized thereby when conduction in said transistor is increased upon detection of signals of said predetermined frequency.

3. A signaling system for providing selective operation in response to signals of a predetermined frequency comprising a pair of line terminals for receiving remotely transmitted ringing signals, an antiresonant and a resonant network connected in series across said line terminals, said networks being tuned to a ringing signal of predetermined frequency, rectifying means connected to said terminals and individual to said networks for providing voltages of positive polarity when signals of said predetermined frequency are received at said terminals and for providing voltages of negative polarity when signals remote from said predetermined frequency are received at said terminals, transistor oscillating means connected to said rectifying means and controlled by the voltages therefrom, and a ringer in circuit with said transistor oscillating means whereby said voltages of positive polarity cause said oscillating means to oscillate thereby to energize the ringer in circuit therewith and said voltages of negative polarity prevent said oscillating means from oscillating.

4. In a multiparty station signaling system, a selective ringing circuit comprising a pair of line terminals for receiving a plurality of ringing signals of different predetermined frequencies transmitted thereto from a remote office, circuit means tuned to one of said predetermined frequencies connected to said line terminals for generating voltages of positive polarity in response to signals of the tuned frequency and for generating voltages of negative polarity in response to signals remote from the tuned frequency, a transistor oscillator circuit connected to the tuned circuit means, the operating condition of which is determined by the polarity of the voltages generated by said circuit means, and a ringer in circuit with said transistor oscillator, whereby said oscillator is caused to oscillate and energize the ringer when said voltages of positive polarity are applied thereto and said oscillator is prevented from operating when said voltages of negative polarity are applied thereto.

5. A selective signaling system for providing selective operation in response to signals of a predetermined frequency comprising first and second line conductors, an antiresonant network having one terminal thereof connected to said first line conductor, a resonant network having one terminal thereof connected to said second line conductor, a transistor oscillator circuit having a transistor including base, collector, and emitter electrodes, a first resistance and a first capacitance connected in series between said collector and emitter electrodes, a ringer in series with a source of potential connected between said base and collector electrodes, a first diode poled so as to pass voltages of positive polarity in series with a second capacitance connected between said first line conductor and said base electrode, a second diode poled so as to pass voltages of negative polarity in series with a third capacitance connected between said second line conductor and said base electrode, said antiresonant and resonant networks being connected to said base electrode, and second and third resistance means connected each of said diodes to said first capacitance.

6. A selective signaling system in accordance with claim 5 wherein said first diode is poled to pass voltages of positive polarity to cause said transistor oscillator to operate only in response to signals of said predetermined frequency and said second diode is poled to pass voltages of negative polarity to prevent said transistor oscillator from operating in response to signals remote from said predetermined frequency.

7. A selective signaling system comprising a signal network and a guard network, said signal network antiresonant and said guard network resonant at a predetermined signaling frequency, and transistor means having base, collector, and emitter electrodes, one of said electrodes connected to one side of each of said networks, another of said electrodes connected to the other side of each of said networks and connected to said third electrode through series connected biasing means and signaling means, said signaling means controlled by the operation of said transistor means, whereby received signals of said predetermined frequency cause said transistor means to increase conduction to enable operation of said signaling means and received signals remote from said signaling frequency tend to decrease conduction in said transistor means to prevent operation of said signaling means.

References Cited in the file of this patent

UNITED STATES PATENTS

| | | |
|---|---|---|
| 2,343,759 | Fairley | Mar. 7, 1944 |
| 2,642,500 | Fritschi et al. | June 16, 1953 |
| 2,654,002 | Hooijkamp et al. | Sept. 29, 1953 |
| 2,658,112 | Davison et al. | Nov. 3, 1953 |
| 2,686,227 | Ryall | Aug. 10, 1954 |
| 2,824,175 | Meacham et al. | Feb. 18, 1958 |
| 2,889,410 | Hatton | June 2, 1959 |